(12) United States Patent
Shields et al.

(10) Patent No.: US 11,767,885 B2
(45) Date of Patent: Sep. 26, 2023

(54) TORQUE TRANSFER COUPLING

(71) Applicant: PRATT & WHITNEY CANADA CORP., Longueuil (CA)

(72) Inventors: Mark Shields, Burlington (CA); David Menheere, Norval (CA); Dennis Kim, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 194 days.

(21) Appl. No.: 17/320,306

(22) Filed: May 14, 2021

(65) Prior Publication Data

US 2022/0364611 A1 Nov. 17, 2022

(51) Int. Cl.
*F16D 3/60* (2006.01)
(52) U.S. Cl.
CPC ........... *F16D 3/60* (2013.01); *Y10T 403/1624* (2015.01); *Y10T 403/61* (2015.01)
(58) Field of Classification Search
CPC ..... F16D 3/60; Y10T 403/1624; Y10T 403/61
USPC .......................................................... 464/82
See application file for complete search history.

(56) References Cited

U.S. PATENT DOCUMENTS

| 1,986,437 | A | * | 1/1935 | Hipple | F16D 3/68 |
| | | | | | 464/83 |
| 2,970,019 | A | | 9/1958 | Brown et al. | |
| 3,296,832 | A | * | 1/1967 | Fawick | F16D 3/56 |
| | | | | | 464/82 |
| 3,681,939 | A | * | 8/1972 | Timtner | F16D 3/66 |
| | | | | | 464/82 |
| 3,712,434 | A | | 1/1973 | Anderson et al. | |
| 3,748,868 | A | * | 7/1973 | Poget | F16D 3/56 |
| | | | | | 464/82 |
| 5,088,581 | A | * | 2/1992 | Duve | F16D 41/18 |
| 10,837,496 | B2 | | 11/2020 | Kowalewski et al. | |
| 11,401,870 | B2 | * | 8/2022 | Alecu | F16D 3/62 |

(Continued)

FOREIGN PATENT DOCUMENTS

DE 433120 C 8/1926
DE 1253524 B 11/1967

OTHER PUBLICATIONS

European Searh Report issued in counterpart application No. 22173106.0 dated Oct. 14, 2022.

*Primary Examiner* — Greg Binda
(74) *Attorney, Agent, or Firm* — NORTON ROSE FULBRIGHT CANADA LLP.

(57) ABSTRACT

A coupling has: a first coupler rotatable about an axis and defining first connections distributed about the axis; a second coupler defining second connections distributed about the axis, the second connections offset from the first connections; and segments distributed about the axis and extending radially from the first connections to the second connections, a segment of the segments having a first end engaging a first connection of the first connections and a second end engaging a second connection of the second connections, the first end circumferentially offset from the second end, a face of the segment abutting against a face of the first coupler when the segment is inserted into the first connection in a first orientation such that a penetration depth of the segment into the first connection in the first orientation is less than the penetration depth in a second orientation opposite the first orientation.

18 Claims, 5 Drawing Sheets

(56) References Cited

U.S. PATENT DOCUMENTS 11,529,705 B1 * 12/2022 Menheere ............... F01D 5/026
2015/0176661 A1 6/2015 Diemer et al.

* cited by examiner

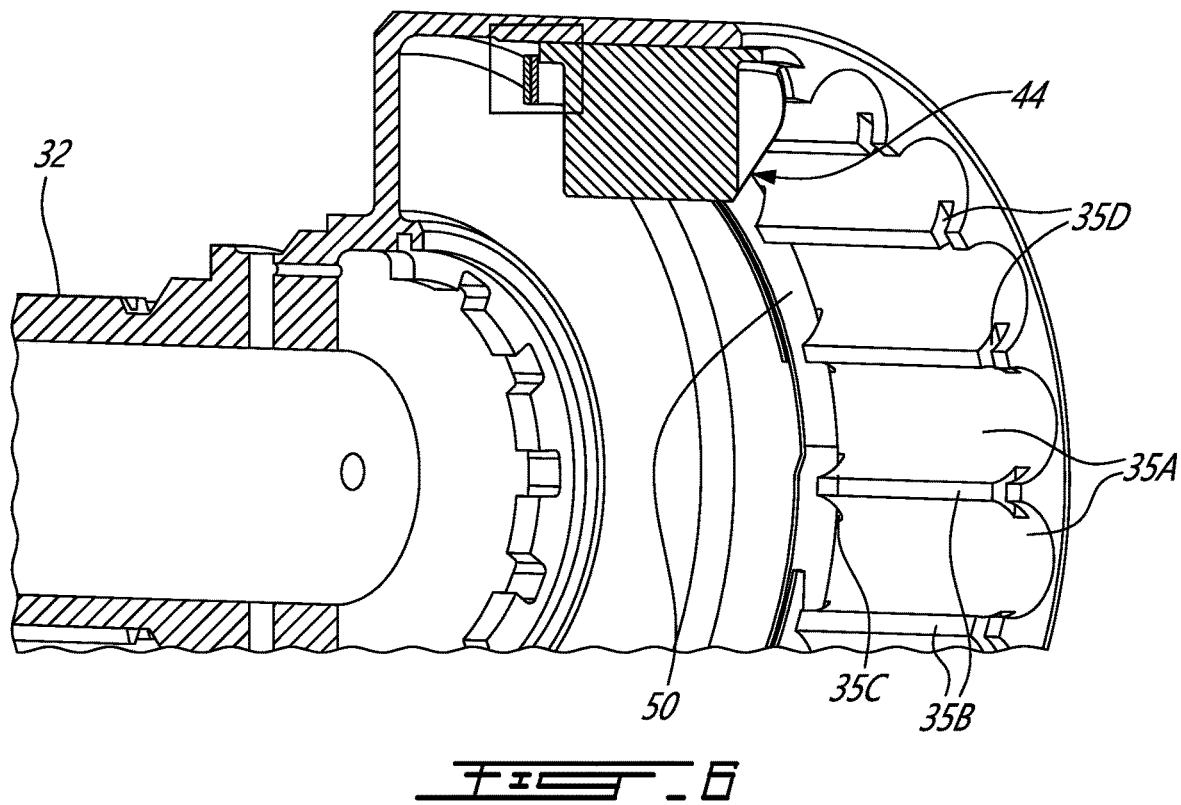
FIG. 6
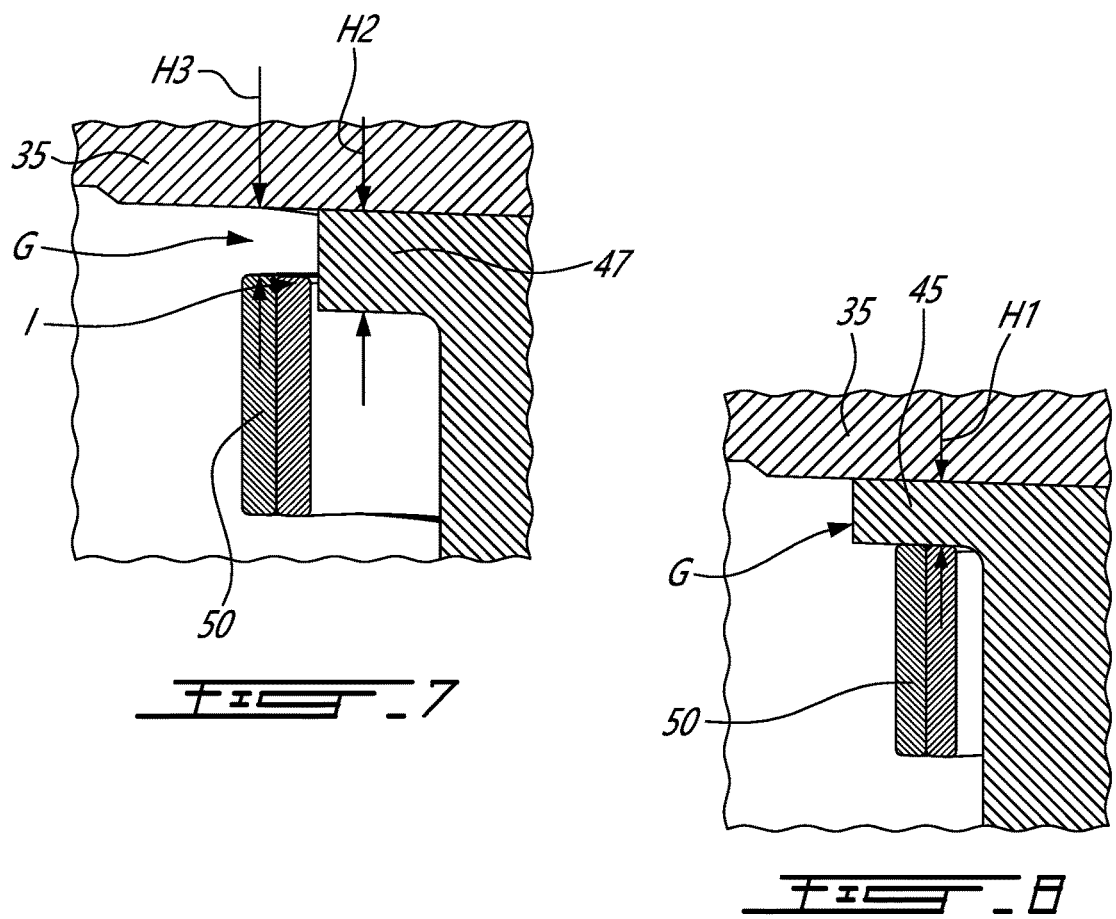
FIG. 7
FIG. 8

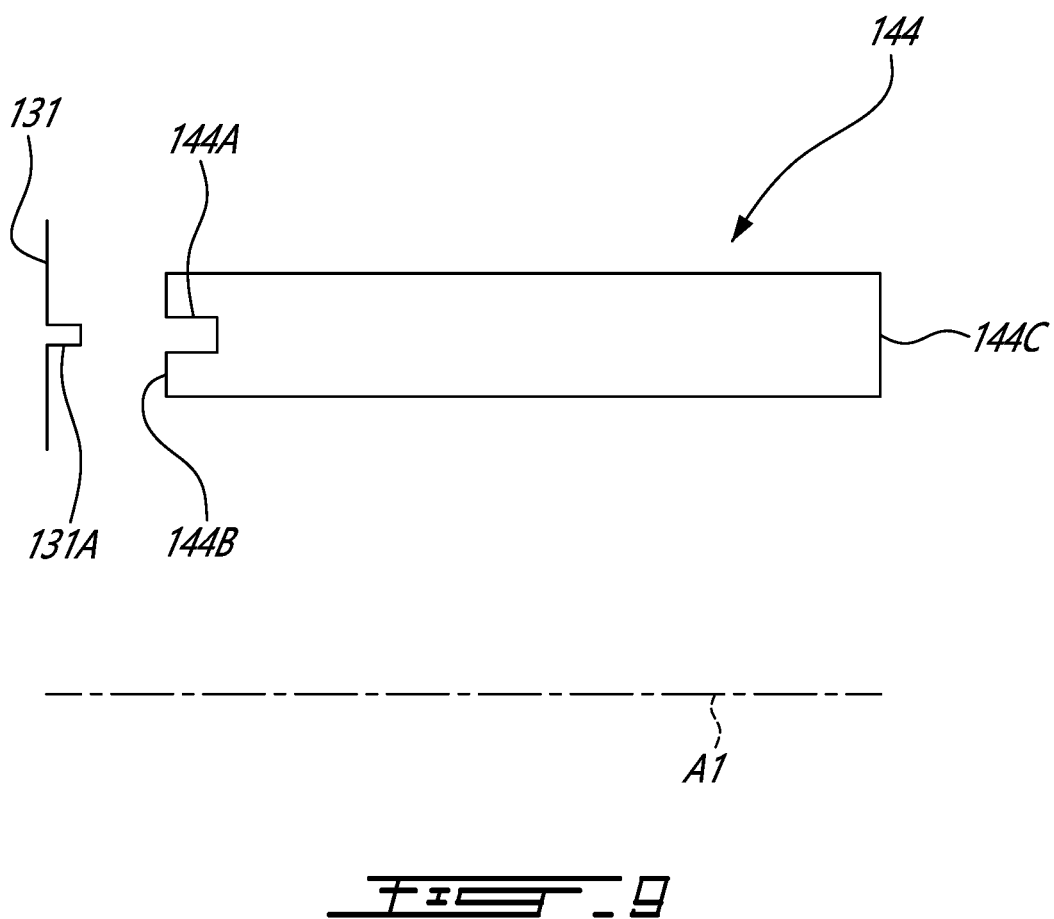

TORQUE TRANSFER COUPLING

TECHNICAL FIELD

The application relates generally to gas turbine engines and, more particularly, to systems and methods used to transfer torque between two components of said engines.

BACKGROUND OF THE ART

Couplings are used in a wide variety of applications to transfer torque from one rotary component (such as a shaft) of one piece of equipment to a rotary component of another. Common considerations in coupling design include achieving satisfactory dynamic stress resistance and low friction in operating conditions varying across the operation envelope, as well as limiting costs. In aeronautic applications, minimizing weight is also typically a significant design consideration. The individual pieces of equipment can be manufactured separately. Many couplings require to align the axes of the two rotary components within a certain degree of tolerance, to a point which can be difficult or challenging to achieve in practice, and increasing the degree of tolerance to misalignment has represented significant trade-offs or sacrifices on at least some of the design considerations. There always remains room for improvement, such as addressing misalignment tolerance considerations.

SUMMARY

In one aspect, there is provided a coupling comprising: a first coupler rotatable about an axis, the first coupler defining first connections circumferentially distributed about the axis; a second coupler defining second connections circumferentially distributed about the axis, the second connections radially offset from the first connections relative to the axis; and segments circumferentially distributed about the axis and extending radially from the first connections to the second connections, a segment of the segments having a first end engaging a first connection of the first connections and a second end engaging a second connection of the second connections, the first end circumferentially offset from the second end, a face of the segment abutting against a face of the first coupler when the segment is inserted into the first connection in a first orientation of the segment relative to the first coupler such that a penetration depth of the segment into the first connection in the first orientation is less than the penetration depth in a second orientation opposite the first orientation.

In some embodiments, the first coupler includes a retaining ring extending circumferentially around the axis, the face of the first coupler defined by the retaining ring.

In some embodiments, the segment has a first tab protruding axially from a first axial end face of the segment, the face of the segment defined by the first tab, the first tab axially abutting the retaining ring in the first orientation, the first tab free of an abutment with the retaining ring in the second orientation.

In some embodiments, the first coupler includes a first peripheral wall extending circumferentially around the axis, the first peripheral wall defining the first connections, a gap extending radially between the first peripheral wall and the retaining ring, a height of the first tab in a radial direction relative to the axis greater than a height of the gap in the first orientation to limit the penetration depth of the segment relative to the first connection.

In some embodiments, the segment includes a second tab protruding axially from a second axial end face of the segment opposite the first axial end face, a height of the second tab being less than the height of the gap such that the second tab is receivable into the gap in the second orientation.

In some embodiments, the first peripheral wall is located radially outwardly relative to a second peripheral wall of the second coupler, the second peripheral wall defining the second connections.

In some embodiments, the first coupler includes a first retaining ring and a second retaining ring, the segments including first tabs protruding axially from first axial end faces of the segments and second tabs protruding axially from second axial end faces of the segments, the first tabs biased radially by the first retaining ring, the second tabs biased radially by the second retaining ring.

In some embodiments, the first tabs and the second tabs are off-centered relative to a mid-planes of the segments.

In some embodiments, the first connections are sockets defined by a first peripheral wall of the first coupler, the sockets being circumferentially interspaced with crests, each of the crests defining a first notch receiving the first retaining ring and a second notch receiving the second retaining ring.

In some embodiments, first gaps are located between the first retaining ring and the first peripheral wall, a height of a first tab of the first tabs greater than a height of a first gap of the first gaps, a height of a second tab of the second tabs less than the height of the first gap such that insertion of the first tab into the first gap is prevented and that insertion of the second tab into the first gap is allowed.

In some embodiments, second gaps are located between the second retaining ring and the first peripheral wall, wherein, in the first orientation, the second tab is axially offset from the second notch and, in the second orientation, the first tab and the second tab are each axially aligned with a corresponding one of the first notch and the second notch.

In some embodiments, the penetration depth is taken in an axial direction relative to the axis.

In another aspect, there is provided a coupling comprising: a first coupler rotatable about an axis, the first coupler defining first connections circumferentially distributed about the axis; a retaining ring secured to the first coupler; a second coupler defining second connections circumferentially distributed about the axis, the second connections radially offset from the first connections relative to the axis; and segments circumferentially distributed about the axis and extending radially from the first connections to the second connections, a segment of the segments having a first end engaging a first connection of the first connections and a second end engaging a second connection of the second connections, the first end circumferentially offset from the second end, the segment including a retaining tab protruding from an axial end face of the segment, the retaining ring engaging the retaining tab to bias the retaining tab in a radial direction relative to the axis when the segment is received in the first connection in a first orientation, the retaining tab abutting a face of the first coupler to prevent insertion of the segment in the first connection in a second orientation opposite the first orientation.

In some embodiments, the first coupler includes a second retaining ring extending circumferentially around the axis, the face of the first coupler defined by the second retaining ring.

In some embodiments, the first coupler includes a first peripheral wall extending circumferentially around the axis, the first peripheral wall defining the first connections, a gap extending radially between the first peripheral wall and the second retaining ring, a height of the retaining tab in a radial direction relative to the axis greater than a height of the gap in the first orientation to prevent insertion of the segment in the first connection in the second orientation.

In some embodiments, the segment includes a second tab, a height of the second tab being less than the height of the gap such that the second tab is receivable into the gap in the second orientation.

In some embodiments, the first connections are sockets defined by a first peripheral wall of the first coupler, the sockets being circumferentially interspaced with crests, each of the crests defining a notch receiving the retaining ring and a second notch receiving a second retaining ring.

In some embodiments, a height of the retaining tab is greater than a height of a gap extending radially between the first peripheral wall and the second retaining ring, a height of a second retaining tab protruding from a second axial end face of the segment opposite the axial end face being less than the height of the gap such that insertion of the retaining tab into the gap is prevented and that insertion of the second retaining tab into the gap is allowed.

In yet another aspect, there is provided a coupling comprising: a first coupler rotatable about an axis, the first coupler defining first connections circumferentially distributed about the axis; a second coupler defining second connections circumferentially distributed about the axis, the second connections radially offset from the first connections relative to the axis; segments circumferentially distributed about the axis and extending radially from the first connections to the second connections, a segment of the segments having a first end engaging a first connection of the first connections and a second end engaging a second connection of the second connections, the first end circumferentially offset from the second end; and means for preventing engagement of the segment in the first connections in a first orientation of the segment relative to the first coupler.

In some embodiments, the means include a retaining tab greater than a gap between a retaining ring and a peripheral wall of the first coupler defining the first connections.

DESCRIPTION OF THE DRAWINGS

Reference is now made to the accompanying figures in which:

FIG. 6 is a three dimensional cutaway partially assembled view of the coupling of FIG. 2;

FIG. 7 is an enlarged view of a portion of FIG. 6 showing an interference when the segment is inserted in a wrong orientation;

FIG. 8 is an enlarged view of a portion of the coupling of FIG. 2 showing a segment correctly installed; and FIG. 9 is a schematic top view of a segment in accordance with another embodiment.

DETAILED DESCRIPTION

Figure 1:
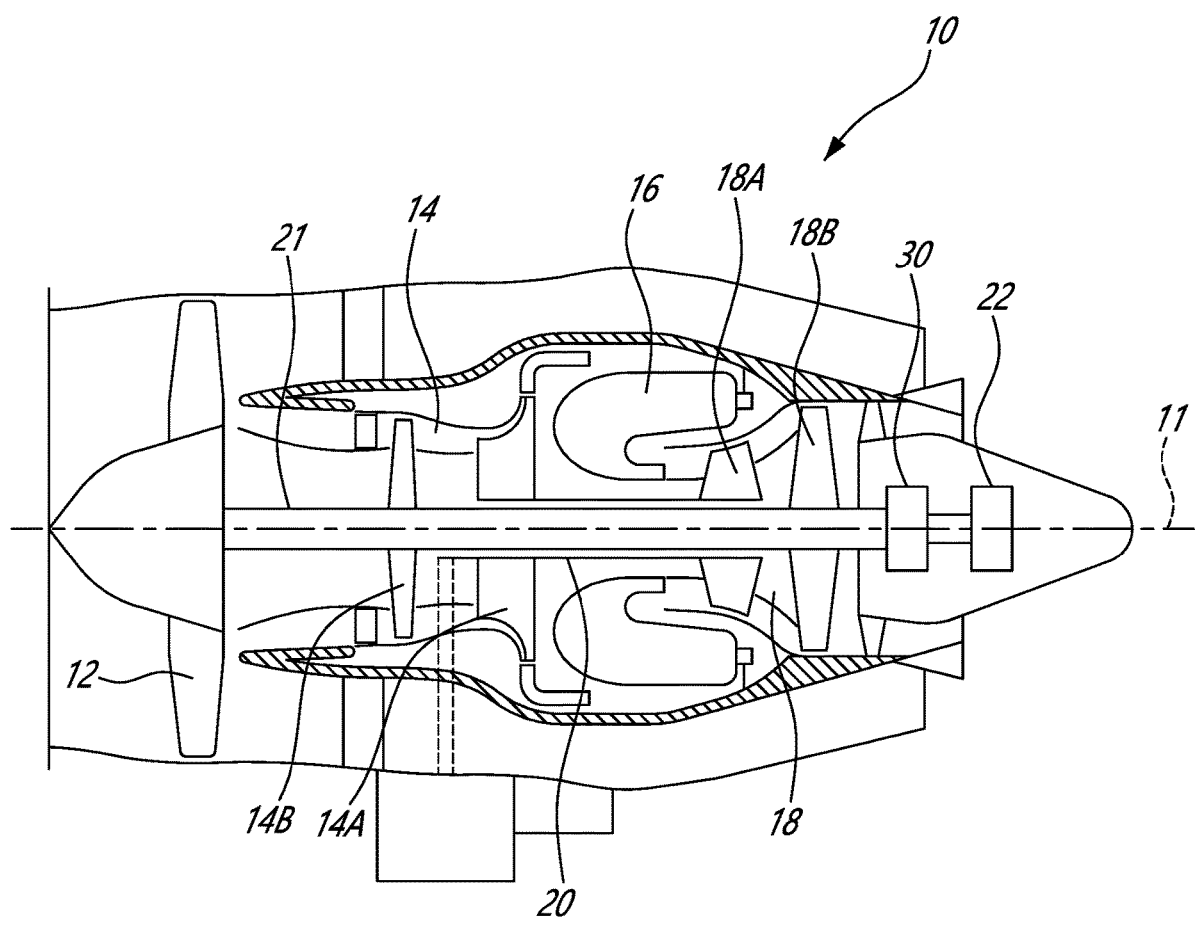
FIG. 1 is a schematic cross sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section to a low-pressure compressor 14B of the compressor section 14 and drivingly engaged to the fan 12. It will be understood that the contents of the present disclosure may be applicable to any suitable engines, such as turboprops and turboshafts, and reciprocating engines, such as piston and rotary engines without departing from the scope of the present disclosure.

In the embodiment shown, the low-pressure shaft 21 is drivingly engaged to an accessory 22. The accessory may be, for instance, a generator, a gearbox, a pump, and so on. In the present case, a coupling 30 is used to transmit a rotational input from the low-pressure shaft 21 to the accessory 22. The coupling 30 may allow the removal of the accessory 22, either for maintenance or for substitution for another accessory. The coupling 30 is further described in U.S. patent application Ser. No. 17/022,203 filed on Sep. 16, 2020, now U.S. Pat. No. 11,401,870 the entire contents of which are incorporated herein by reference in their entirety.

Figure 2:
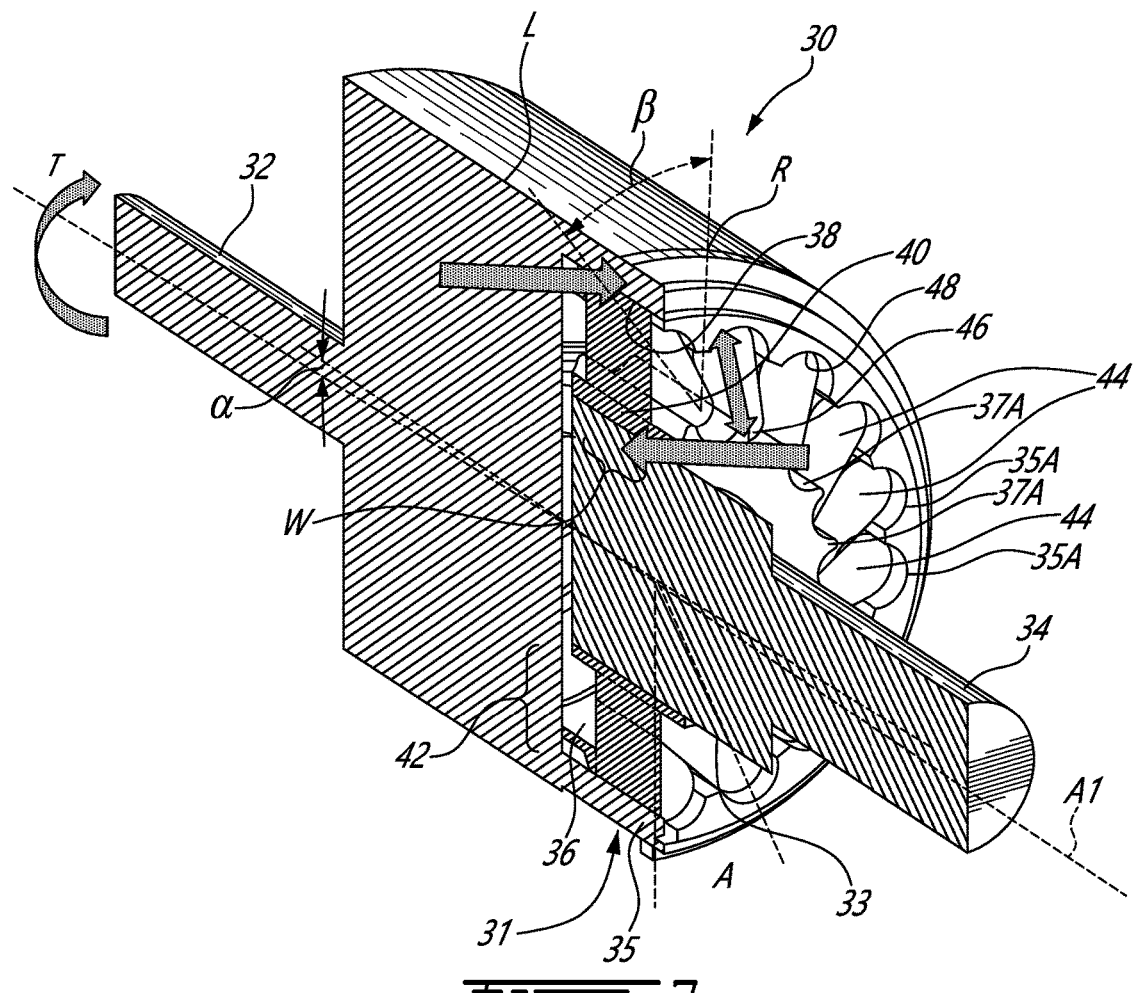
FIG. 2 is a three dimensional cutaway view of a coupling for the gas turbine engine of FIG. 1.
Figure 3:
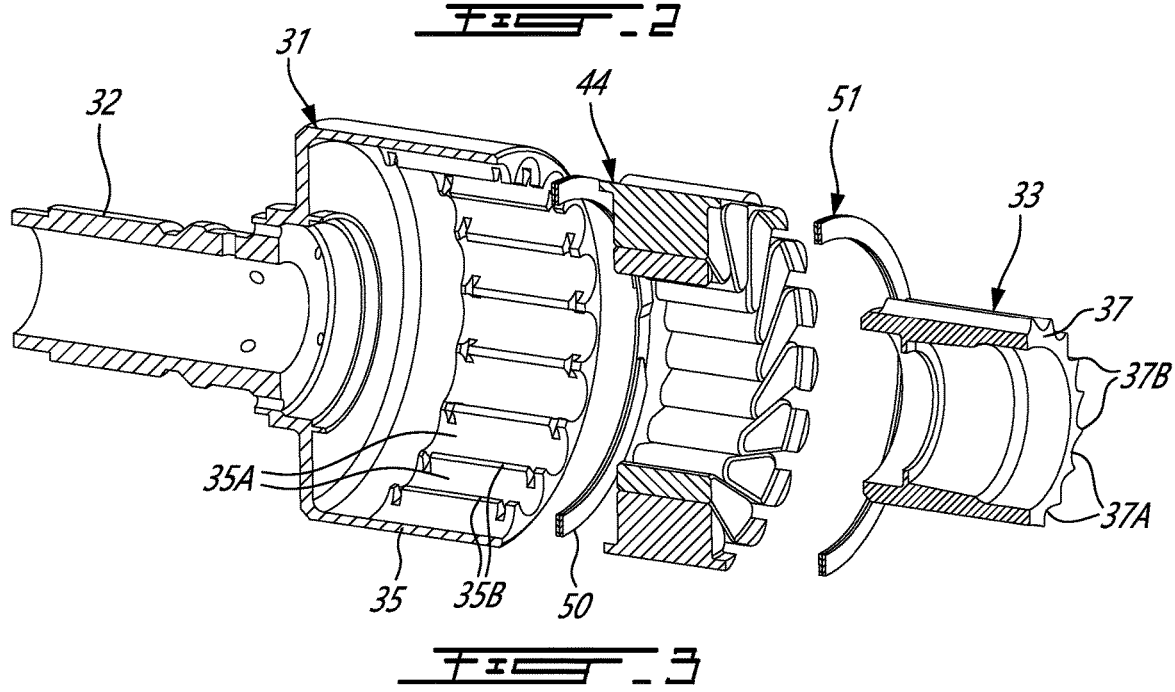
FIG. 3 is a three dimensional cutaway exploded view of the coupling of FIG. 2.

Referring to FIGS. 2-3, the coupling 30 is described in more details. In the embodiment shown, the coupling 30 has two rotary members 32, 34, presented here in the form of shafts, and is used generally for the function of transferring torque from one of the rotary members 32 to the other 34. Each of the two rotary members 32, 34 is connected to a respective one of a female coupler 31 and a male coupler 33. There can be some degree of misalignment (e.g. angle α) which may need to be accommodated between the axes of these rotary members 32, 34.

In the embodiment shown, the female coupler 31 defines a recess 36 that is circumscribed by a peripheral wall 35 extending around a rotation axis A1 of the coupling 30. The peripheral wall 35 forms a radially inner-facing surface that will be referred to herein as more concisely as the inner face 38. The male coupler 34 has a peripheral wall 37 extending around the rotation axis A1. The peripheral wall 37 forms a radially outer-facing surface, or outer face 40, that is received into the recess 36. The outer face 40 has a smaller diameter than the inner face 38, and a spacing 42 is present between the inner face 38 and the outer face 40. The peripheral wall 35 of the female coupler 31 defines a plurality of connections 35A. The peripheral wall 37 of the male coupler 33 defines a plurality of connections 37A. These connections 35A, 37A are sockets having a substantially cylindrical shape and are interspaced with ridges or crests 35B, 37B. Other shapes are contemplated.

A plurality of circumferentially arranged links or segments 44 occupy the spacing 42. Each segments 44 has an radially inner end 46 connected to the outer face 40, and a radially outer end 48 connected to the inner face 38. The inner end 46 is engaged to a respective one of the connections 37A of the peripheral wall 37 of the male coupler 33. The outer end 48 is engaged to a respective one of the connections 35A of the peripheral wall 35 of the female coupler 31. A shape of the radially inner end 46 and of the radially outer end 48 are selected to matingly engage the connections 35A, 37A. The connections 35A, 37A are used to prevent the radially inner end 46 and the radially outer end 48 from circumferentially sliding along the inner face 38 and the outer face 40 they are connected to, and thereby fix the relative circumferential position between the inner end 46 and the outer end 48. The connection can be pivotal, rigid, or pivotal with a partial rigidity. Different types of connections can be used in different embodiments. Depending of the exact choice of connection type, the segment-receiving connections formed in the inner face and the outer face can involve a corresponding form of irregularity in the surface geometry. The irregularity can be in the form of a seat such as a protrusion, recess, or other shape complementary to the shape of the corresponding end, or in the form of a slot or hole to receive a pivot pin, to name some possible examples. The segments extend obliquely, in the sense that the general orientation of their length between the inner end 46 and the outer end 48 is inclined, or slanted, e.g. by angle β, from the radial orientation R. In other words, the outer end of each segment is circumferentially offset from the segment's inner end by an arc A. In other the radially inner end 46 is circumferentially offset from the radially outer end 48 relative to the rotation axis A1.

In the embodiment shown, the segments 44 are pivotally engaged within their connections 35A, 37A. The pivotal connections may be provided via engagement between rounded ends of the segments 44 and the matching connections 35A, 37A in the form of rounded sockets in the inner face 38 and the outer face 40. In an alternate embodiment, for instance, the pivotal connection can be achieved via an axially protruding pin in each one of the ends, and a corresponding slot to receive the pin tips on both axial sides of the segment, for instance. In still another embodiment, the connections can be provided in the form of rounded protrusions formed in the corresponding one, or both, of the inner face and the outer face, and a rounded recess of a matching shape can be formed in the corresponding end or ends of the segment, thereby inversing the male/female roles, to name another possible example.

In some embodiments, connections which allow for pivoting of the segments around one or both ends can be preferred, whereas in other embodiments, non-pivotal, or partially pivoting connections which cause bending deformation in the segment in addition to compressive stress may be preferred. The connections which are part of the male member may be referred to as the male member connections and the connections which are part of the female member can be referred to as the female member connections for simplicity.

The segments 44 are configured to work in compression during torque-transfer operation, and transfer torque by a combination of their compression stress (there can also be some degree of bending stress if the connection is not purely pivotal) and of their inclination/obliqueness R. In an embodiment where the female coupler 31 is the driving member, the inner end 46 of each segments 44 will be circumferentially offset from the outer end 48 in the direction of the torque T, which results in compressing the segments 44. In an alternate embodiment where the male coupler 33 is the driving member, the outer ends 48 of the segments 44 would instead be circumferentially offset from the inner ends 46 in the direction of application of the torque T, which would also result in compressing the segments during torque transfer. Accordingly, the direction in which the inner ends 46 are circumferentially offset from the outer ends 48 may be selected as a function of the orientation of the torque T, and of whether the female coupler 31 or the male coupler 33 is the driving member, with the goal of subjecting the segments to compression during torque transfer.

The segments 44 may be configured in a manner to operate collectively, but as independent bodies from the point of view of stress gradients. The segments 44 may be separate individual components, mechanically connected to one another only indirectly, via the male coupler 33 and the female coupler 31. By operating partially or fully in compression, and by being shaped and sized appropriately, they may each independently transfer a portion of the torque, without individually imparting shear or tensile stress into an adjacent segment. They may be relatively slender (i.e. thin in the orientation normal to their length in a transverse plane), which can allow them to elastically deform to a greater extend than, thicker components, or than a component forming a full annulus. This may contribute in accommodating a satisfactory degree of axial misalignment a between the male coupler 33 and the female coupler 31. Moreover, the segments 44 can have an axial dimension, referred to herein as width W, which is significant relative to their length, such as in the same order of magnitude, similar or greater dimensions, to spread the compressive force along the width W. Spreading a given amount of compressive force (stemming from a given amount of torque T) along a greater width W, can limit the compressive force density, and allow a greater amount of torsion between the two axially opposite sides. In some embodiments, the torsion deformation capability of the segments can be harnessed to accommodate misalignment. In yet some other embodiments, it can be preferred to segment the segments into two or more components along their axial length, allowing the individual components to work independently from another, without transmitting torsion stress from one component of the segment to the adjacent other one. The width W can be significantly greater than the thickness, for instance. The coupling 30 can be designed in a manner for the full width to remain in contact with both of the female coupler 31 and the male coupler 33 due to deformation. The segments 44 can accommodate misalignment by deformation rather than by displacement relative to the members, which can be favorable from the point of view of wear resistance. In other embodiments it can be preferred to reduce the width W as much as possible in a manner to reduce weight, for instance.

In some embodiments, an even greater degree of axial misalignment may be accommodated by selecting, for the material of the segments 44, a material having a Young's modulus significantly lower than the Young's modulus of the material forming the female coupler 31 and the male coupler 33. For instance, in a scenario where the female coupler 31 and the male coupler 33 are made of steel, the segments can be made of a suitable plastic. A plastic material with greater viscoelastic behavior can be preferred to accommodate rapid overload, but may be less performant in terms of recovery factor at slower loading rates. Polyimide plastic materials such as Vespel™ may be an interesting candidate due to features such as heat resistance, and can have a Young's modulus two degrees or magnitude lower (~100 times lower) than the Young's modulus of steel. Depending on the embodiment, other materials can be selected, such as other plastics, structured materials like metal foams, aerogels, and 3D-printed un-isotropic metal lattices which provide a low apparent Young modulus and even be more suitable at higher temperature environments.

Similarly, lower cost materials than Vespel™ may be preferred in lower temperature environments.

Another potential reason for selecting a different material for the segments than for the male and female members is that it may be preferred for the material of the segment to have a greater coefficient of thermal expansion than the coefficient of thermal expansion of the male and female members. Indeed, in cases where the typical operation temperature range of the coupling is significantly above ambient temperature/standard atmospheric conditions, having a greater coefficient of thermal expansion can simplify assembly. Indeed, the length of the segments can be designed to be shorter that the distance between the members which they are designed to occupy during operation conditions. Accordingly, the segments can be inserted easily into the spacing, with some degree of play allowed at, say, 20° C., and be designed to grow and extend as the temperature rises during normal operation, in a manner to stabilize in an equilibrium configuration where the combination of thermal growth and deformation from mechanical stress lead to maintaining a given design slant angle β at a given set of conditions of torque and temperature, and depart from this target slant angle within set tolerances as the torque and temperature vary within the operation envelope. Similarly, and the thermal "shrinking" can be harnessed at disassembly, to avoid the phenomena of worn parts becoming "hooked" on others, especially in blind assemblies.

The slant angle β can also affect the density of the compressive stress. In one embodiment, it can be preferred to optimize the slant angle β in a manner to minimize compressive stress density. In a scenario where it is also preferred to limit backlash to within 2 degrees, it can be preferred to select a slant angle of between 52 and 60 degrees measured from the outer pitch diameter tangent, with the range of between 54 and 58 degrees being more preferred in some embodiments. The ideal slant angle can be of 55 degrees in one embodiment, for instance. In other words, the angle β can be of between 30 and 38 degrees, preferably between 32 and 36, and ideally of about 35 degrees.

Figure 4:
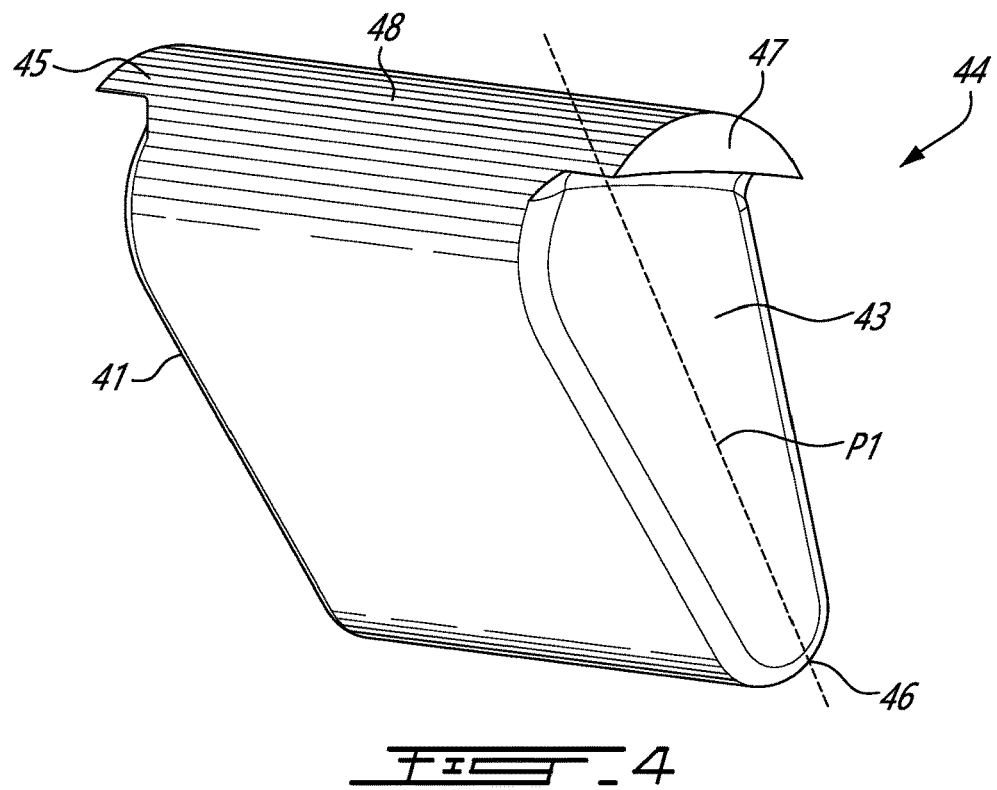
FIG. 4 is a three dimensional view of a segment or link for the coupling of FIG. 2 in accordance with one embodiment.

Referring to FIGS. 3-6, in the embodiment shown, the segments 44 extend between a first axial end face 41 at a first axial end and a second axial end face 43 at a second axial end and opposite the first axial end face 41. Each of the segments 44 includes each a first tab 45 axially protruding from the first axial end face 41 and away form the second axial end face 43, and a second tab 47 axially protruding from the second axial end face 43 and away from the first axial end face 41. As shown in FIG. 3, the first tab 45 and the second tab 47 are engaged by a first retaining ring 50 and by a second retaining ring 51 of the female coupler 31, respectively. As shown in FIG. 4, the first tab 45 and the second tab 47 are off-centered relative to a mid-plane P1 intersecting both of the inner end 46 and the outer end 48 and intersecting the first axial end face 41 and the second axial end face 43. In other words, the segment 44 may be non-symmetric.

As shown in FIG. 6, the peripheral wall 35 of the female coupler 31 defines notches. Namely, each of the crests 35B defines a first notch 35C and a second notch 35D axially spaced apart form the first notch 35C relative to the rotation axis A1. The first notch 35C is sized to receive the first retaining ring 50. The second notch 35D is sized to receive the second retaining ring 52. The first tab 45 is disposed radially between the first retaining ring 50 and the peripheral wall 35 of the female coupler 31. The second tab 47 is disposed radially between the second retaining ring 51 and the peripheral wall 35 of the female coupler 31. The first retaining ring 50 and the second retaining ring 51 bias the first tab 45 and the second tab 47 radially outwardly against the peripheral wall 35 and are used to maintain the segments 44 in engagement within their connections 35A.

As explained above, the segments 44 may be inserted into engagement with their connections 35A, 37A defined by the peripheral wall 35 of the female coupler 31 and by the peripheral wall 37 of the male coupler 33 at two different relative orientations depending of a direction of the torque T. In other words, each of the segments 44 may be received into the recess 36 in a first relative orientation by inserting the first axial end face 41 first or be received into the recess 36 in a second relative orientation by inserting the second axial end face 43 first. In some cases, care should be taken to avoid the segment 44 from being inserted in the wrong orientation since this may affect a torque transfer between the components drivingly engaged to one another via the coupling 30.

Figure 5:
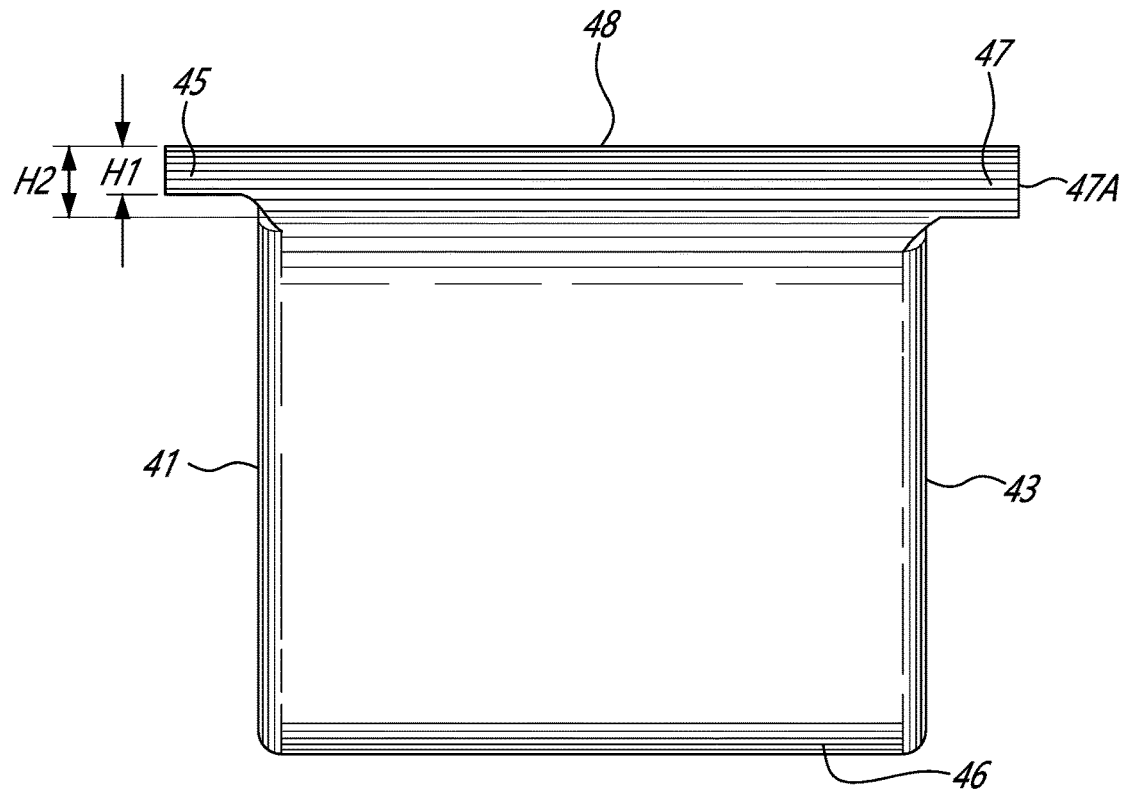
FIG. 5 is a plan view of the segment of FIG. 4.

As shown in FIG. 5, in the embodiment shown, the first tab 45 has a dimension that is less than that of the second tab 47 to prevent the insertion of the segment 44 in the wrong relative orientation. More specifically, the first tab 45 has a height H1 taken along a radial direction relative to the rotation axis A1 that is less than a height H2 of the second tab 47. The first and second tabs 45, 47 have radial-faces that face the rotation axis A1 and that are arcuate; a diameter of the radial-face of the first tab 45 relative to the rotation axis A1 may be greater than that of the radial-face of the second tab 47. As shown in FIG. 7, if the second tab 47 is inserted first in the recess 36, an interference I will occur between a distal end of the second tab 47 and the first retaining ring 50. In other words, a face of one of the segments 44 will abut a face of the female coupler 31. In the present embodiment, the face of the one of the segments 44 corresponds to an axial end face 47A of the second tab 47 and the face of the female coupler 31 corresponds to a face of the first retaining ring 50. Stated differently, this interference I is created by the radial height H2 of the second tab 47 being greater than a radial height H3 (FIG. 7) of a gap G between the first retaining ring 50 and the peripheral wall 35 at the first notch 35C. As shown in FIG. 8, when the segment 44 is inserted in the proper orientation, the first tab 45 is received into the gap G between the peripheral wall 35 and the first retaining ring 50 because the radial height H1 of the first tab 45 is less than the radial height H3 of the gap G. Hence, when the segment 44 is inserted in the proper orientation, the first tab 45 is free of an axial interference and abutment with the first retaining ring 50.

Moreover, if the segments 44 are not inserted into the recess 36 in the proper orientation, they would not be able to be inserted all the way. Hence, a penetration depth of the segments 44 into the connections 35A in the improper orientation is less than the penetration depth in the proper orientation. The penetration depth is taken in an axial direction relative to the rotation axis A1. This difference in penetration depth may indicate a user assembling the coupling 30 of this misalignment. The user may then rotate the segments 44 end to end and re-insert them in the connections 35A to notice that they go deeper into the connections 35A. This is indicative of the proper alignment of the segments 44 relative to the female coupler 31. Furthermore, if the segments 44 are not inserted in the proper orientation, the first tab 45 and the second tab 47 will be axially offset from their first notch 35C and second notch 35D thereby preventing the installation of the second retaining ring 51. If the segments 44 are inserted in the proper orientation, the first tab 45 will be aligned with the first notch 35C and the second tab 47 will be aligned with the second notch 35D.

Referring now to FIG. 9, another embodiment of a female coupler 131 and of a segment 144 are shown. In the embodiment shown, the female coupler 131 defines a member 131A, such as a pin, a tab, or a protrusion, that protrudes axially relative to the rotation axis A1. The segment 144 defines a recess 144A that extends from a first axial end face 144B toward a second axial end face 144C opposed to the first axial end face 144B. When the segment 144 is inserted in the proper orientation, the member 131A will penetrate the recess 144A thereby allowing a full penetration depth of the segment 144 into the respective connection of the female coupler 131. However, if the segment 144 is inserted in the wrong orientation, the member 131A will abut against the second axial end face 144C of the segment 144 thereby preventing proper insertion of the segment 144 into the respective connection of the female coupler 131 and limiting the penetration depth. This may indicate the user that the segment 144 has been inserted in the wrong orientation.

It will be appreciated that any suitable means used for preventing engagement of the segments 44 in the connections 35A or the connections 37A in the wrong orientation are contemplated. For instance, a keyway engagement between the inner end 46 and the connections 37A of the male coupler 33 and/or between the outer end 48 and the connections 35A of the female coupler 31 may be used. Any tab and slot engagement may be used to solely allow the segments 44 to be inserted in the proper orientation. Only one of the segments 44 may present features preventing the wrong orientation since it may not be possible to have only one segment wrongly inserted. The means preventing the wrong orientation may be defined by interferences between the outer end 48 and the female coupler 31 and/or between the inner end 46 and the male coupler 33.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A coupling comprising:
   a first coupler rotatable about an axis, the first coupler defining first connections circumferentially distributed about the axis;
   a second coupler defining second connections circumferentially distributed about the axis, the second connections radially offset from the first connections relative to the axis;
   segments circumferentially distributed about the axis and extending radially from the first connections to the second connections, a segment of the segments having a first end engaging a first connection of the first connections and a second end engaging a second connection of the second connections, the first end circumferentially offset from the second end; and
   means for preventing engagement of the segment in the first connections in a first orientation of the segment relative to the first coupler, the means including a retaining tab greater than a clap between a retaining ring and a peripheral wall of the first coupler defining the first connections.

2. A coupling comprising:
   a first coupler rotatable about an axis, the first coupler defining first connections circumferentially distributed about the axis;
   a second coupler defining second connections circumferentially distributed about the axis, the second connections radially offset from the first connections relative to the axis; and
   segments circumferentially distributed about the axis and extending radially from the first connections to the second connections, a segment of the segments having a first end engaging a first connection of the first connections and a second end engaging a second connection of the second connections, the first end circumferentially offset from the second end,
   a face of the segment abutting against a face of the first coupler when the segment is inserted into the first connection in a first orientation of the segment relative to the first coupler such that a penetration depth of the segment into the first connection in the first orientation is less than the penetration depth in a second orientation opposite the first orientation, the penetration depth being taken in an axial direction relative to the axis.

3. The coupling of claim 2, wherein the first coupler includes a retaining ring extending circumferentially around the axis, the face of the first coupler defined by the retaining ring.

4. The coupling of claim 3, wherein the segment has a first tab protruding axially from a first axial end face of the segment, the face of the segment defined by the first tab, the first tab axially abutting the retaining ring in the first orientation, the first tab free of an abutment with the retaining ring in the second orientation.

5. The coupling of claim 4, wherein the first coupler includes a first peripheral wall extending circumferentially around the axis, the first peripheral wall defining the first connections, a gap extending radially between the first peripheral wall and the retaining ring, a height of the first tab in a radial direction relative to the axis greater than a height of the gap in the first orientation to limit the penetration depth of the segment relative to the first connection.

6. The coupling of claim 5, wherein the segment includes a second tab protruding axially from a second axial end face of the segment opposite the first axial end face, a height of the second tab being less than the height of the gap such that the second tab is receivable into the gap in the second orientation.

7. The coupling of claim 6, wherein the first peripheral wall is located radially outwardly relative to a second peripheral wall of the second coupler, the second peripheral wall defining the second connections.

8. The coupling of claim 2, wherein the first coupler includes a first retaining ring and a second retaining ring, the segments including first tabs protruding axially from first axial end faces of the segments and second tabs protruding axially from second axial end faces of the segments, the first tabs biased radially by the first retaining ring, the second tabs biased radially by the second retaining ring.

9. The coupling of claim 8, wherein the first tabs and the second tabs are off-centered relative to is llmid-planes of the segments.

10. The coupling of claim 8, wherein the first connections are sockets defined by a first peripheral wall of the first coupler, the sockets being circumferentially interspaced with crests, each of the crests defining a first notch receiving the first retaining ring and a second notch receiving the second retaining ring.

11. The coupling of claim 10, comprising first gaps between the first retaining ring and the first peripheral wall, a height of a first tab of the first tabs greater than a height of a first gap of the first gaps, a height of a second tab of the second tabs less than the height of the first gap such that insertion of the first tab into the first gap is prevented and that insertion of the second tab into the first gap is allowed.

12. The coupling of claim 11, comprising second gaps between the second retaining ring and the first peripheral wall, wherein, in the first orientation, the second tab is axially offset from the second notch and, in the second orientation, the first tab and the second tab are each axially aligned with a corresponding one of the first notch and the second notch.

13. A coupling comprising:
a first coupler rotatable about an axis, the first coupler defining first connections circumferentially distributed about the axis;
a retaining ring secured to the first coupler;
a second coupler defining second connections circumferentially distributed about the axis, the second connections radially offset from the first connections relative to the axis; and
segments circumferentially distributed about the axis and extending radially from the first connections to the second connections, a segment of the segments having a first end engaging a first connection of the first connections and a second end engaging a second connection of the second connections, the first end circumferentially offset from the second end,
the segment including a retaining tab protruding from an axial end face of the segment, the retaining ring engaging the retaining tab to bias the retaining tab in a radial direction relative to the axis when the segment is received in the first connection in a first orientation, the retaining tab abutting a face of the first coupler to prevent insertion of the segment in the first connection in a second orientation opposite the first orientation.

14. The coupling of claim 13, wherein the first coupler includes a second retaining ring extending circumferentially around the axis, the face of the first coupler defined by the second retaining ring.

15. The coupling of claim 14, wherein the first coupler includes a first peripheral wall extending circumferentially around the axis, the first peripheral wall defining the first connections, a gap extending radially between the first peripheral wall and the second retaining ring, a height of the retaining tab in a radial direction relative to the axis greater than a height of the gap in the first orientation to prevent insertion of the segment in the first connection in the second orientation.

16. The coupling of claim 15, wherein the segment includes a second tab, a height of the second tab being less than the height of the gap such that the second tab is receivable into the gap in the second orientation.

17. The coupling of claim 13, wherein the first connections are sockets defined by a first peripheral wall of the first coupler, the sockets being circumferentially interspaced with crests, each of the crests defining a notch receiving the retaining ring and a second notch receiving a second retaining ring.

18. The coupling of claim 17, wherein a height of the retaining tab is greater than a height of a gap extending radially between the first peripheral wall and the second retaining ring, a height of a second retaining tab protruding from a second axial end face of the segment opposite the axial end face being less than the height of the gap such that insertion of the retaining tab into the gap is prevented and that insertion of the second retaining tab into the gap is allowed.

* * * * *